United States Patent [19]

Nagata et al.

[11] Patent Number: 5,360,853
[45] Date of Patent: Nov. 1, 1994

[54] POLYVINYL CHLORIDE-BASED RESIN COMPOSITION

[75] Inventors: Satoshi Nagata, Ibaraki; Osamu Sodeyama, Chiba, both of Japan

[73] Assignee: Shin-Etsu Chemical Co., Ltd., Tokyo, Japan

[21] Appl. No.: 895,553

[22] Filed: Jun. 8, 1992

[30] Foreign Application Priority Data

Jun. 10, 1991 [JP] Japan .................. 3-164967

[51] Int. Cl.$^5$ ............................. C08K 5/24
[52] U.S. Cl. ..................... 524/269; 524/504; 524/505; 524/506; 524/569
[58] Field of Search ........................ 524/269

[56] References Cited

U.S. PATENT DOCUMENTS 4,381,361  4/1983  Hardt et al. .................. 524/269

Primary Examiner—Joseph L. Schofer
Assistant Examiner—Peter D. Mulcahy
Attorney, Agent, or Firm—McAulay Fisher Nissen Goldberg & Kiel

[57] ABSTRACT

Disclosed is a novel polyvinyl chloride-based resin composition having good workability in molding and capable of giving a shaped article having excellent mechanical properties such as impact strength. The resin composition comprises: (a) 100 parts by weight of a polyvinyl chloride resin having an average degree of polymerization of 500 to 2500; (b) from 4 to 15 parts by weight of an ABS or MBS resin; (c) from 1 to 7 parts by weight of an SBR; (d) from 1 to 10 parts by weight of an AS resin; and (e) from 0.1 to 10 parts by weight of a polyorganosiloxane.

8 Claims, No Drawings

POLYVINYL CHLORIDE-BASED RESIN COMPOSITION

BACKGROUND OF THE INVENTION

The present invention relates to a polyvinyl chloride resin-based composition having good workability and capable of giving a shaped article with excellent impact strength.

With an object to improve the impact strength of a shaped article obtained from a polyvinyl chloride resin, attempts have been made heretofore to admix a polyvinyl chloride resin with an impact strength improver which is a copolymeric resin of acrylonitrile, butadiene and styrene, referred to as an ABS resin hereinbelow, a copolymeric resin of methyl methacrylate, butadiene and styrene, referred to as an MBS resin hereinbelow, a copolymeric resin of ethylene and vinyl acetate, referred to as an EVA resin hereinbelow, a styrene-butadiene copolymeric rubber, referred to as an SBR hereinbelow, or the like.

One of the problems in the use of an ABS resin, MBS resin or SBR as the impact strength improver is that the shaped article obtained from such a polyvinyl chloride resin composition has relatively low weatherability because these polymers contain double bonds in the molecular structure thereof having susceptibility to the influence of visible and ultraviolet lights and heat. Addition of an antioxidant, ultraviolet absorber and the like to such a polyvinyl chloride resin composition can be a remedy for this defect but this measure can never give a quite satisfactory result in respect of the properties of the shaped articles of the resin composition.

On the other hand, EVA resins as an impact strength improver have another problem that delicate adjustment is required in the molding conditions such as the molding temperature because the polyvinyl chloride resin and the EVA resin may be uniformly melted together resulting in a decrease in the impact strength of the shaped articles when the molding temperature is too high or the staying time of the resin composition in the molding machine is too long.

Further, it is a usual formulation that a polyvinyl chloride resin composition is compounded with a large amount of an inorganic filler with an object to impart the shaped article obtained from the resin composition with improved flame retardancy. When the amount of the compounded inorganic filler is increased, a decrease is caused in various properties of the shaped articles of the resin composition such as impact strength, tensile strength and the like. In addition, most of these fillers consist of finely divided particles having a low coefficient of friction between particles so that compounding of a polyvinyl chloride resin composition with such an inorganic filler has an effect that, when the resin composition is molded by extrusion molding using an extruder machine, the rate of extrusion is decreased at a specified temperature and under a specified pressure to increase the staying time of the resin composition in the extruder machine adversely influencing on the quality of the shaped articles in addition to the problems of scorch, plate-out and the like.

SUMMARY OF THE INVENTION

The present invention accordingly has an object to provide a novel and improved polyvinyl chloride-based resin composition having excellent workability in molding and capable of giving a shaped article having well balanced properties such as impact strength, tensile strength and the like as well as quite satisfactory appearance.

Thus the polyvinyl chloride resin-based composition of the present invention is a uniform blend which comprises:

(a) 100 parts by weight of a polyvinyl chloride resin having an average degree of polymerization in the range from 500 to 2500;

(b) from 4 to 15 parts by weight of a copolymeric resin of acrylonitrile, butadiene and styrene or a copolymeric resin of methyl methacrylate, butadiene and styrene;

(c) from 1 to 7 parts by weight of a styrene-butadiene copolymeric rubber;

(d) from 1 to 10 parts by weight of a copolymeric resin of acrylonitrile and styrene; and (e) from 0.1 to 10 parts by weight of a polyorganosiloxane.

In particular, it is preferable that the copolymeric resin as the component (b) is of a graft-polymer type containing from 40 to 80% by weight of the butadiene moiety. The styrene-butadiene copolymeric rubber as the component (c) preferably has a linear block-wise molecular structure of styrene-butadiene-styrene, of which the weight ratio of the styrene moiety to the butadiene moiety is in the range from 30:70 to 60:40. Further, the acrylonitrilestyrene copolymeric resin as the component (d) contains preferably from 10 to 30% by weight of the acrylonitrile moiety. The polyorganosiloxane as the component (e) is preferably a polydimethylsiloxane of which a part of the methyl groups are replaced with long-chain alkyl groups having 4 to 16 carbon atoms or 2-phenylpropyl groups.

DETAILED DESCRIPTION OF THE PREFERRED EMBODIMENTS

The base ingredient in the inventive resin composition is the component (a) which is a polyvinyl chloride-based resin having an average degree of polymerization of 500 to 2500 or, preferably, 800 to 1700. The polyvinyl chloride-based resin can be not only a homopolymeric polyvinyl chloride resin but also a copolymeric resin of vinyl chloride with one or more of comonomers copolymerizable with vinyl chloride provided that the content of the vinyl chloride moiety therein is at least 50% by weight. The copolymer can also be a graft copolymer of vinyl chloride on to various kinds of other polymers or various kinds of monomers on to a polyvinyl chloride resin.

The comonomer copolymerizable with vinyl chloride above mentioned includes α-olefins such as ethylene, propylene, 1-butene, 1-pentene, 1-hexene, 1-heptene, 1-octerie, 1-nonenie, 1-decene, 1-undecene, 1-dodecene, 1-tridecene, 1-tetradecene and the like, acrylic acid and esters thereof such as methyl acrylate, ethyl acrylate and the like, methacrylic acid and esters thereof such as methyl methacrylate and the like, maleic acid and esters thereof, vinyl esters such as vinyl acetate, vinyl propionate and the like, vinyl ethers such as lauryl vinyl ether, isobutyl vinyl ether and the like, maleic arthydride, styrene, vinylidene chloride and so on. These comonomers can be copolymerized with vinyl chloride either singly or as a combination of two kinds or more according to need. The graft copolymers include those of vinyl chloride on to a copolymer of ethylene and vinyl acetate, vinyl chloride on to a copolymeric rubber of ethylene and propylene, styrene on to a polyvinyl chloride, butadiene on to a polyvinyl chloride, methyl methacrylate on to a polyvinyl chloride and so on.

When the polyvinyl chloride-based resin has an average degree of polymerization smaller than 500, the resin composition cannot give a shaped article having high impact strength and tensile strength while, when the average degree of polymerization of the resin is too large, the resin composition would have poor workability in molding due to the excessively high viscosity of the molten resin requiring a high extrusion torque in molding so that the resin is subject to thermal degradation at the temperature resulting in a decrease in the properties inherently excellent in polyvinyl chloride-based resins.

The component (b) is a copolymeric resin of acrylonitrile, butadiene and styrene, referred to as an ABS resin hereinafter, or a copolymeric resin of methyl methacrylate, butadiene and styrene, referred to as an MBS resin hereinafter, and it is compounded with the polyvinyl chloride-based resin as the component (a) in an amount in the range from 4 to 15 parts by weight or, preferably, from 7 to 12 parts by weight per 100 parts by weight of the component (a). When the amount thereof is too small, full improvement cannot be obtained in the impact strength of the shaped articles prepared by molding the resin composition. When the amount thereof is too large, on the other hand, adverse influences are caused on the flowability of the resin composition in molding and heat resistance and tensile strength of the shaped articles prepared from the composition in addition to the somewhat poor appearance of the shaped articles prepared by extrusion molding of the resin composition.

It is preferable that the ABS resin and MBS resin are each of the graft-copolymer type and the content of the butadiene moiety therein is in the range from 40 to 80% by weight. When the content of the butadiene moiety is too large, the resin composition compounded therewith would be poor in the flowability and the tensile strength of the shaped articles thereof would be decreased although the shaped articles are excellent in respect of the impact strength. When the content of the butadiene moiety is too small, no substantial improvement can be obtained in the impact strength of the resin composition.

The component (c) is a styrene-butadiene copolymeric rubber, referred to as an SBR hereinafter, and amount thereof in the inventive resin composition is in the range form 1 to 7 parts by weight or, preferably, from 2 to 5 parts by weight per 100 parts by weight of the polyvinyl chloride-based resin as the component (a). When the amount thereof is too small, no improvement can be obtained in the flowability of the resin composition resulting in poor workability in addition to eventual occurrence of fine splits on the outer surface of the shaped articles. When the amount thereof is too large, on the other hand, a decrease is caused in the impact strength of the shaped articles of the resin composition along with a decrease in the Vicat softening point and other physical properties.

It is preferable that the SBR has a linear block molecular structure of the S-B-S type and the weight ratio of the styrene moiety to the butadiene moiety therein is in the range from 30:70 to 60:40 or, more preferably, from 35:65 to 60:40.

The component (d) is a copolymeric resin of acrylonitrile and styrene, referred to as an AS resin hereinafter, and the amount thereof in the inventive resin composition is in the range from 1 to 10 parts by weight or, preferably, from 3 to 7 parts by weight per 100 parts by weight of the polyvinyl chloride-based resin as the component (a). When the amount thereof is too small, no improvement can be obtained in the tensile strength of the shaped articles prepared from the resin composition while, when the amount thereof is too large, a decrease is caused in the impact strength of the shaped articles.

It is preferable that the weight ratio of the acrylonitrile moiety to the styrene moiety in the AS resin is in the range from 10:90 to 30:70 or, more preferably, from 20:80 to 25:75. When the content of the acrylonitrile moiety is too small, the AS resin would have poor miscibility with the polyvinyl chloride-based resin eventually to cause phase separation. When the content of the acrylonitrile moiety is too large, on the other hand, a decrease is caused in the flowability of the resin composition in molding.

The polyorganosiloxane as the component (e) is preferably a polydimethylsiloxane of a linear molecular structure having a viscosity in the range from 100 to 7000 centistokes or, more preferably, from 300 to 2000 centistokes at 25° C., of which a part of the methyl groups are replaced with long-chain alkyl groups having 4 to 16 carbon atoms or with 2-phenylpropyl groups. These substituent groups can be introduced into the polyorganosiloxane by the hydrosilation reaction of an $\alpha$-olefin having 4 to 16 carbon atoms per molecule or $\alpha$-methylstyrene, respectively, to the silicon-bonded hydrogen atoms in a methyl hydrogen polysiloxane. The content of such modifying substituent groups in the modified polydimethylsiloxane is preferably in the range from 30 to 80% by moles of all of the organic groups bonded to the silicon atoms.

The amount of the component (e) in the inventive resin composition is in the range from 0.1 to 10 parts by weight or, preferably, from 0.1 to 2 parts by weight per 100 parts by weight of the polyvinyl chloride-based resin as the component (a). When the amount thereof is too small, no improvement can be obtained in the flowability of the resin composition in molding with eventual occurrence of fine splits on the surface of the shaped articles prepared from the resin composition. When the amount thereof is too large, on the other hand, a decrease is caused in the tensile strength of the shaped articles prepared from the resin composition.

In addition to the above described essential components (a) to (e), the inventive resin composition can optionally be compounded with various kinds of additives known in the formulation of a polyvinyl chloride-based resin composition each in a limited amount. For example, any known stabilizers conventionally used with a polyvinyl chloride resin can be used here without particular limitations including stabilizers such as organic tin compounds of the laurate type, maleate type and mercaptide type and metal soaps of calcium, barium, lead and the like. Suitable stabilizing aids include epoxy compounds, ultraviolet absorbers and antioxidants. Suitable lubricants include waxy hydrocarbons such as paraffin waxes and polyethylene waxes, higher fatty acids such as palmitic acid and stearic acid, aliphatic higher alcohols such as stearyl alcohol and esters of higher fatty acids with a monohydric alcohol or polyhydric alcohol. It is usually preferable that the resin composition of the invention is compounded with a substantial amount of an inorganic filler which is preferably a calcium carbonate filler including heavy and light ones, of which a light calcium carbonate filler is preferred, and compounded in a large amount when impact strength is the key factor in the mechanical properties of the shaped articles of the resin composition.

In the following, the polyvinyl chloride-based resin composition of the invention is described in more detail by way of examples and comparative examples, in which the term of "parts" always refers to "parts by weight". The materials used for compounding the resin composition in each of the experiments are characterized below.

Polyvinyl Chloride Resin

PVC-I: homopolymeric polyvinyl chloride resin having an average degree of polymerization of 400, TK-400, a product by Shin-Etsu Chemical Co.

PVC-II: homopolymeric polyvinyl chloride resin having an average degree of polymerization of 1000, TK-1000, a product by the same company as above PVC-III: homopolymeric polyvinyl chloride resin having an average degree of polymerization of 3000, TK-3000, a product by the same company as above

Stabilizer organic tin compound, TM-181SFJ, a product by Katsuta Kako Co.

Stabilizing Aid calcium stearate

Inorganic Filler $CaCO_3$: calcium carbonate, Hakuenka CCR, a product by Shiraishi Calcium Co.

$TiO_2$: titanium dioxide, CR-60, a product by the same company as above

ABS Resin graft-copolymer type, containing 65% by weight of butadiene moiety, Blendex 467, a product by General Electric Co.

MBS Resin graft-copolymer type, containing 65% by weight of butadiene moiety, Metaprene C-223, a product by Mitsubishi Rayon Co.

SBR

S-B-S linear chain type, weight ratio of styrene:butadiene 40:60, TRKX-138S, a product by Shell Chemical Co.

AS Resin weight ratio of acrylonitrile:styrene 23:77, FD, a product by Daicel Co.

Polyorganosiloxane

POS-I: polydimethylsiloxane having a viscosity of 500 centistokes at 25° C., modified with alkyl groups of 12 to 14 carbon atoms for a part of methyl groups, KF-412, a product by Shin-Etsu Chemical Co.

POS-II: Polydimethylsiloxane having a viscosity of 1000 centistokes at 25° C., modified with 2-phenylpropyl groups for a part of methyl groups, KF-410, a product by the same company as above POS-III: polydimethylsiloxane having a viscosity of 5000 centipoise at 25° C., KF-96, a product by the same company as above

EXAMPLE 1

A resin composition was prepared by uniformly blending, in a Henschel mixer, 100 parts of PVC-II, 9 parts of the MBS resin, 3 parts of the SBR, 5 parts of the AS resin, 0.5 part of the POS-I, 1.5 parts of the stabilizer. 1.0 part of the stabilizing aid, 3 parts of the calcium carbonate filler and 3 parts of the titanium dioxide filler and the resin composition was pelletized by using a single-screw extruder machine of 20 mm diameter. The pellets were shaped into a sheet by using a similar extruder machine to record the torque and pressure in extrusion and rate of extrusion as shown in Table 1. The thus obtained sheet was visually examined for the surface luster and occurrence of fine splits at the end of the sheet. The results shown in Table 2 are expressed in six ratings giving point 6 to the best condition and 0 to the poorest condition for each of the surface luster and occurrence of fine splits.

The resin composition obtained in the Henschel mixer was further kneaded on a 6-inch two-roller mill at 170° C. for 5 minutes and then shaped into a sheet having a thickness of 0.8 mm, which was subjected to the tests of the impact strength and the tensile properties including the yield value, tensile strength and ultimate elongation at break to give the results shown in Table 2.

EXAMPLE 2

The experimental procedure was just the same as in Example 1 excepting replacement of the MBS resin with the same amount of the ABS resin. The results of the evaluation tests are shown in Tables 1 and 2.

EXAMPLE 3

The experimental procedure was just the same as in Example 2 excepting replacement of POS-I with the same amount of POS-II. The results of the evaluation tests are shown in Tables 1 and 2.

EXAMPLE 4

The experimental procedure was just the same as in Example 2 excepting replacement of POS-I with the same amount of POS-III. The results of the evaluation tests are shown in Tables 1 and 2.

COMPARATIVE EXAMPLE 1

The experimental procedure was just the same as in Example 2 excepting replacement of PVC-II with the same amount of PVC-I. The results of the evaluation tests are shown in Tables 1and 2.

COMPARATIVE EXAMPLE 2

The experimental procedure was just the same as in Example 2 excepting replacement of PVC-II with the same amount of PVC-III. The results of the evaluation tests are shown in Tables 1 and 2.

COMPARATIVE EXAMPLE 3

The experimental procedure was just the same as in Example 2 excepting a decrease in the amount of the ABS resin from 9 parts to 3 parts. The results of the evaluation tests are shown in Tables 1 and 2.

COMPARATIVE EXAMPLE 4

The experimental procedure was just the same as in Example 2 excepting an increase in the amount of the ABS resin from 9 parts to 16 parts. The results of the evaluation tests are shown in Tables 1 and 2.

COMPARATIVE EXAMPLE 5

The experimental procedure was just the same as in Example 2 excepting a decrease in the amount of the AS resin from 5 parts to 0.5 part. The results of the evaluation tests are shown in Tables 1 and 2.

COMPARATIVE EXAMPLE 6

The experimental procedure was just the same as in Example 2 excepting an increase in the amount of the AS resin from 5 parts to 11 parts. The results of the evaluation tests are shown in Tables 1 and 2.

COMPARATIVE EXAMPLE 7

The experimental procedure was just the same as in Example 2 excepting an increase in the amount of the SBR from 3 parts to 8 parts. The results of the evaluation tests are shown in Tables 1 and 2.

COMPARATIVE EXAMPLE 8

The experimental procedure was just the same as in Example 2 excepting a decrease in the amount of the SBR from 3 parts to 0.5 part. The results of the evaluation tests are shown in Tables 1 and 2.

COMPARATIVE EXAMPLE 9

The experimental procedure was just the same as in Example 2 excepting omission of the polyorganosiloxane. The results of the evaluation tests are shown in Tables 1 and 2.

COMPARATIVE EXAMPLE 10

The experimental procedure was just the same as in Example 2 excepting an increase in the amount of the POS-I from 0.5 part to 11 parts. The results of the evaluation tests are shown in Tables 1 and 2.

TABLE 1

|  | Torque at extrusion, kg · m | Extrusion pressure, $kg/cm^2$ | Rate of extrusion, g/minute |
| --- | --- | --- | --- |
| Example 1 | 6.2 | 372 | 48.3 |
| Example 2 | 5.0 | 330 | 47.2 |
| Example 3 | 6.4 | 325 | 41.8 |
| Example 4 | 6.0 | 340 | 45.1 |
| Comparative Example 1 | 4.5 | 270 | 46.2 |
| Comparative Example 2 | 7.5 | 453 | 41.3 |
| Comparative Example 3 | 4.4 | 273 | 45.1 |
| Comparative Example 4 | 5.5 | 360 | 43.6 |
| Comparative Example 5 | 5.6 | 375 | 47.0 |
| Comparative Example 6 | 4.8 | 320 | 47.1 |
| Comparative Example 7 | 6.9 | 445 | 49.8 |
| Comparative Example 8 | 4.2 | 280 | 41.0 |
| Comparative Example 9 | 7.1 | 451 | 43.0 |
| Comparative Example 10 | 3.7 | 243 | 43.0 |

TABLE 2

|  | Luster | Fine splits | Impact strength, kg · $cm/cm^2$ | Yield value, $kg/cm^2$ | Tensile strength, $kg/cm^2$ | Ultimate elongation, % |
| --- | --- | --- | --- | --- | --- | --- |
| Example 1 | 5 | 4 | 138 | 451 | 478 | 163 |
| Example 2 | 5 | 5 | 127 | 459 | 492 | 173 |
| Example 3 | 5 | 5 | 133 | 462 | 486 | 159 |
| Example 4 | 5 | 4 | 109 | 420 | 408 | 141 |
| Comparative Example 1 | 5 | 4 | 56 | 410 | 403 | 110 |
| Comparative Example 2 | 4 | 4 | 106 | 402 | 381 | 91 |
| Comparative Example 3 | 3 | 4 | 26 | 481 | 473 | 141 |
| Comparative Example 4 | 4 | 1 | 136 | 420 | 411 | 114 |
| Comparative Example 5 | 4 | 3 | 105 | 405 | 390 | 107 |
| Comparative Example 6 | 4 | 1 | 24 | 471 | 483 | 141 |
| Comparative Example 7 | 3 | 3 | 63 | 410 | 401 | 117 |
| Comparative Example 8 | 4 | 1 | 112 | 470 | 452 | 135 |
| Comparative Example 9 | 1 | 2 | 125 | 452 | 463 | 121 |
| Comparative Example 10 | 5 | 4 | 41 | 395 | 381 | 89 |

What is claimed is:

1. A polyvinyl chloride resin-based composition which comprises, as a uniform blend:
   (a) 100 parts by weight of a polyvinyl chloride resin having an average degree of polymerization in the range from 500 to 2500;
   (b) from 4 to 15 parts by weight of a graft copolymeric resin of acrylonitrile, butadiene and styrene or methyl methacrylate, butadiene and styrene, each containing from 40 to 80% by weight of the butadiene;
   (c) from 2 to 5 parts by weight per 100 parts by weight of component (a) of styrene-butadiene copolymeric rubber having a linear block molecular structure of styrene-butadiene-styrene, of which the weight ratio of the styrene moiety to the butadiene moiety is in the range from 30:70 to 60:40;
   (d) from 1 to 10 parts by weight of a copolymeric resin of acrylonitrile and styrene, the amount of acrylonitrile being from 10 to 30% by weight; and
   (e) from 0.1 to 10 parts by weight of a polydimethylsiloxane of which from 30 to 80% by moles of the methyl groups are replaced with alkyl groups having 4 to 16 carbon atoms or 2-phenylpropyl groups.

2. The polyvinyl chloride resin-based composition as claimed in claim 1 in which the polyvinyl chloride resin as the component (a) has an average degree of polymerization in the range from 800 to 1700.

3. The polyvinyl chloride resin-based composition as claimed in claim 1 in which the amount of the component (b) is in the range from 7 to 12 parts by weight per 100 parts by weight of the component (a).

4. The polyvinyl chloride resin-based composition as claimed in claim 1 in which the weight ratio of the styrene moiety to the butadiene moiety in the component (c) is in the range from 35:65 to 60:40.

5. The polyvinyl chloride resin-based composition as claimed in claim 1 in which the amount of the component (d) is in the range from 3 to 7 parts by weight per 100 parts by weight of the component (a).

6. The polyvinyl chloride resin-based composition as claimed in claim 1 in which the weight ratio of the acrylonitrile moiety to the styrene moiety in the component (c) is in the range from 20:80 to 25:75.

7. The polyvinyl chloride resin-based composition as claimed in claim 1 in which the amount of the component (e) is in the range from 0.1 to 2 parts by weight per 100 parts by weight of the component (a).

8. The polyvinyl chloride resin-based composition as claimed in claim 1 in which the polyorganosiloxane as the component (e) has a viscosity in the range from 100 to 7000 centistokes at 25° C.

* * * * *